(12) United States Patent
Pelz et al.

(10) Patent No.: US 11,599,855 B1
(45) Date of Patent: Mar. 7, 2023

(54) SYSTEMS AND METHODS TO ATTRIBUTE AUTOMATED ACTIONS WITHIN A COLLABORATION ENVIRONMENT

(71) Applicant: Asana, Inc., San Francisco, CA (US)

(72) Inventors: Eric Seth Pelz, San Francisco, CA (US); Micah Hanan Fenner, San Francisco, CA (US); Abigail Lorean Kelly, San Francisco, CA (US); Cvetomir I. Cankov, Oakland, CA (US); Alexander Thomas Ryan, San Francisco, CA (US); Adrian Van Yen, Saratoga, CA (US); John Wesley Graham, San Francisco, CA (US); Anna Marie Clifton, San Francisco, CA (US); Lili Jiang Rachowin, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 101 days.

(21) Appl. No.: 16/791,760

(22) Filed: Feb. 14, 2020

(51) Int. Cl.
*G06Q 10/10* (2012.01)
*G06Q 10/06* (2012.01)
(Continued)

(52) U.S. Cl.
CPC ....... *G06Q 10/101* (2013.01); *G06Q 10/0633* (2013.01); *G06Q 10/063114* (2013.01)

(58) Field of Classification Search
CPC ......... G06Q 10/101; G06Q 10/063114; G06Q 10/0633
See application file for complete search history.

(56) References Cited

U.S. PATENT DOCUMENTS 5,233,687 A  8/1993  Henderson, Jr.
5,524,077 A  6/1996  Faaland
(Continued)

FOREIGN PATENT DOCUMENTS

CN   101305350 A  * 11/2008  ............. D06F 33/00
CN   101563671 A  * 10/2009  ............. G05B 15/02
(Continued)

OTHER PUBLICATIONS

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).*

(Continued)

*Primary Examiner* — Tan D Nguyen
(74) *Attorney, Agent, or Firm* — Esplin & Associates, PC

(57) ABSTRACT

Systems and methods to attribute automated actions within a collaboration environment are disclosed. Exemplary implementations may: manage environment state information maintaining a collaboration environment, the collaboration environment being configured to facilitate interaction by users with the collaboration environment, the environment state information including attribution information and automation records for automated actions to carry out in response to trigger events; detect occurrences of the trigger events; effectuate automated actions corresponding to detected occurrences of the trigger events; effectuate presentation of attribution labels for the effectuated ones of the automated actions; and/or perform other operations.

20 Claims, 4 Drawing Sheets

(51) Int. Cl.
*G06Q 10/101* (2023.01)
*G06Q 10/0633* (2023.01)
*G06Q 10/0631* (2023.01)

(56) References Cited

U.S. PATENT DOCUMENTS

| | | | |
|---|---|---|---|
| 5,530,861 A * | 6/1996 | Diamant | G06Q 10/0633 |
| | | | 707/999.001 |
| 5,623,404 A | 4/1997 | Collins | |
| 5,721,770 A | 2/1998 | Kohler | |
| 5,983,277 A | 11/1999 | Heile | |
| 6,024,093 A | 2/2000 | Cron | |
| 6,256,651 B1 | 7/2001 | Tuli | |
| 6,292,830 B1 | 9/2001 | Taylor | |
| 6,385,639 B1 | 5/2002 | Togawa | |
| 6,621,505 B1 | 9/2003 | Beauchamp | |
| 6,629,081 B1 | 9/2003 | Cornelius | |
| 6,769,013 B2 | 7/2004 | Frees | |
| 6,859,523 B1 | 2/2005 | Jilk | |
| 7,020,697 B1 * | 3/2006 | Goodman | G06Q 10/10 |
| | | | 709/223 |
| 7,039,596 B1 | 5/2006 | Lu | |
| 7,086,062 B1 | 8/2006 | Faour | |
| 7,349,920 B1 | 3/2008 | Feinberg | |
| 7,418,482 B1 | 8/2008 | Lusher | |
| 7,428,723 B2 | 9/2008 | Greene | |
| 7,640,511 B1 | 12/2009 | Keel | |
| 7,676,542 B2 | 3/2010 | Moser | |
| 7,779,053 B2 * | 8/2010 | Beck | G05B 23/0248 |
| | | | 707/812 |
| 7,805,327 B1 | 9/2010 | Schulz | |
| 7,917,855 B1 | 3/2011 | Satish | |
| 7,996,744 B2 | 8/2011 | Ojala | |
| 7,996,774 B1 | 8/2011 | Sidenur | |
| 8,214,747 B1 | 7/2012 | Yankovich | |
| 8,314,809 B1 | 11/2012 | Grabowski | |
| 8,499,300 B2 | 7/2013 | Zimberg | |
| 8,522,240 B1 | 8/2013 | Merwarth | |
| 8,527,287 B1 | 9/2013 | Bhatia | |
| 8,554,832 B1 | 10/2013 | Moskovitz | |
| 8,572,477 B1 | 10/2013 | Moskovitz | |
| 8,627,199 B1 | 1/2014 | Handley | |
| 8,639,552 B1 | 1/2014 | Chen | |
| 8,768,751 B2 | 7/2014 | Jakowski | |
| 8,831,879 B2 | 9/2014 | Stamm | |
| 8,843,832 B2 | 9/2014 | Frields | |
| 8,863,021 B1 | 10/2014 | Bee | |
| 9,009,096 B2 | 4/2015 | Pinckney | |
| 9,024,752 B2 | 5/2015 | Tumayan | |
| 9,143,839 B2 | 9/2015 | Reisman | |
| 9,152,668 B1 | 10/2015 | Moskovitz | |
| 9,201,952 B1 | 12/2015 | Chau | |
| 9,208,262 B2 | 12/2015 | Bechtel | |
| 9,251,484 B2 | 2/2016 | Cantor | |
| 9,350,560 B2 | 5/2016 | Hupfer | |
| 9,383,917 B2 | 7/2016 | Mouton | |
| 9,405,532 B1 | 8/2016 | Sullivan | |
| 9,405,810 B2 | 8/2016 | Smith | |
| 9,454,623 B1 | 9/2016 | Kaptsan | |
| 9,491,249 B2 * | 11/2016 | Rosenshine | H04M 3/42042 |
| 9,514,424 B2 | 12/2016 | Kleinbart | |
| 9,600,136 B1 | 3/2017 | Yang | |
| 9,712,576 B1 | 7/2017 | Gill | |
| 9,785,445 B2 | 10/2017 | Mitsui | |
| 9,842,312 B1 | 12/2017 | Rosati | |
| 9,949,681 B2 | 4/2018 | Badenes | |
| 9,953,282 B2 | 4/2018 | Shaouy | |
| 9,959,420 B2 | 5/2018 | Kiang | |
| 9,978,040 B2 | 5/2018 | Lee | |
| 9,990,636 B1 | 6/2018 | Lewis | |
| 10,001,911 B2 | 6/2018 | Breedvelt-Schouten | |
| 10,003,693 B2 | 6/2018 | Wolthuis | |
| 10,083,412 B2 | 9/2018 | Suntinger | |
| 10,157,355 B2 | 12/2018 | Johnson | |
| 10,192,181 B2 | 1/2019 | Katkar | |
| 10,235,156 B2 | 3/2019 | Johnson | |
| 10,264,067 B2 | 4/2019 | Subramani | |
| 10,308,992 B2 | 6/2019 | Chauvin | |
| 10,373,084 B2 | 8/2019 | Kurjanowicz | |
| 10,373,090 B2 | 8/2019 | Holm | |
| 10,382,501 B2 | 8/2019 | Malatesha | |
| 10,455,011 B2 | 10/2019 | Kendall | |
| 10,496,943 B2 | 12/2019 | De | |
| 10,594,788 B2 | 3/2020 | Larabie-Belanger | |
| 10,606,859 B2 | 3/2020 | Smith | |
| 10,613,735 B1 | 4/2020 | Karpe | |
| 10,671,692 B2 | 6/2020 | Koopman | |
| 10,684,870 B1 | 6/2020 | Sabo | |
| 10,706,484 B1 | 7/2020 | Murnock | |
| 10,785,046 B1 | 9/2020 | Raghavan | |
| 10,810,222 B2 | 10/2020 | Koch | |
| 10,846,105 B2 | 11/2020 | Granot | |
| 10,846,297 B2 | 11/2020 | Smith | |
| 10,922,104 B2 | 2/2021 | Sabo | |
| 10,956,845 B1 | 3/2021 | Sabo | |
| 10,977,434 B2 | 4/2021 | Pelz | |
| 10,983,685 B2 | 4/2021 | Karpe | |
| 11,082,281 B2 | 8/2021 | Rosenstein | |
| 11,095,468 B1 | 8/2021 | Pandey | |
| 11,113,667 B1 | 9/2021 | Jiang | |
| 11,138,021 B1 | 10/2021 | Rosenstein | |
| 11,140,174 B2 | 10/2021 | Patel | |
| 11,204,683 B1 | 12/2021 | Sabo | |
| 11,212,242 B2 | 12/2021 | Cameron | |
| 11,263,228 B2 | 3/2022 | Koch | |
| 11,288,081 B2 | 3/2022 | Sabo | |
| 11,290,296 B2 | 3/2022 | Raghavan | |
| 11,327,645 B2 | 5/2022 | Karpe | |
| 11,341,444 B2 | 5/2022 | Sabo | |
| 11,341,445 B1 | 5/2022 | Cheng | |
| 2002/0065798 A1 | 5/2002 | Bostleman | |
| 2002/0082889 A1 | 6/2002 | Oliver | |
| 2002/0143594 A1 | 10/2002 | Kroeger | |
| 2003/0028595 A1 | 2/2003 | Vogt | |
| 2003/0036934 A1 | 2/2003 | Ouchi | |
| 2003/0041317 A1 | 2/2003 | Sokolov | |
| 2003/0097410 A1 | 5/2003 | Atkins | |
| 2003/0126001 A1 | 7/2003 | Northcutt | |
| 2003/0225598 A1 | 12/2003 | Yu | |
| 2003/0233265 A1 | 12/2003 | Lee | |
| 2003/0233268 A1 | 12/2003 | Taqbeem | |
| 2004/0030992 A1 | 2/2004 | Moisa | |
| 2004/0083448 A1 | 4/2004 | Schulz | |
| 2004/0093290 A1 | 5/2004 | Doss | |
| 2004/0093351 A1 | 5/2004 | Lee | |
| 2004/0098291 A1 | 5/2004 | Newburn | |
| 2004/0125150 A1 | 7/2004 | Adcock | |
| 2004/0187089 A1 | 9/2004 | Schulz | |
| 2004/0207249 A1 | 10/2004 | Baumgartner | |
| 2004/0230447 A1 | 11/2004 | Schwerin-Wenzel | |
| 2004/0268451 A1 | 12/2004 | Robbin | |
| 2005/0216111 A1 | 9/2005 | Ooshima | |
| 2005/0222971 A1 | 10/2005 | Cary | |
| 2006/0028917 A1 | 2/2006 | Wigginton | |
| 2006/0047454 A1 | 3/2006 | Tamaki | |
| 2006/0085245 A1 | 4/2006 | Takatsuka | |
| 2006/0095859 A1 | 5/2006 | Booking | |
| 2006/0136441 A1 | 6/2006 | Fujisaki | |
| 2006/0167736 A1 | 7/2006 | Weiss | |
| 2006/0190391 A1 | 8/2006 | Cullen, III | |
| 2006/0200264 A1 | 9/2006 | Kodama | |
| 2006/0218551 A1 | 9/2006 | Berstis | |
| 2006/0224430 A1 | 10/2006 | Butt | |
| 2006/0277487 A1 | 12/2006 | Poulsen | |
| 2007/0016646 A1 | 1/2007 | Tendjoukian | |
| 2007/0025567 A1 | 2/2007 | Fehr | |
| 2007/0038494 A1 | 2/2007 | Kreitzberg | |
| 2007/0041542 A1 | 2/2007 | Schramm | |
| 2007/0050225 A1 | 3/2007 | Leslie | |
| 2007/0073575 A1 | 3/2007 | Yomogida | |
| 2007/0143169 A1 | 6/2007 | Grant | |
| 2007/0147178 A1 | 6/2007 | Masuda | |
| 2007/0150327 A1 | 6/2007 | Dromgold | |
| 2007/0232278 A1 | 10/2007 | May | |

(56) References Cited

U.S. PATENT DOCUMENTS

| | | |
|---|---|---|
| 2007/0245300 A1 | 10/2007 | Chan |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0005235 A1 | 1/2008 | Hegde |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0120129 A1 | 5/2008 | Seubert |
| 2008/0126930 A1 | 5/2008 | Scott |
| 2008/0126945 A1 | 5/2008 | Munkvold |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313595 A1 | 12/2008 | Boulineau |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1* | 4/2009 | Appleyard ............ G06F 16/958 715/742 |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2010/0005087 A1 | 1/2010 | Basco |
| 2010/0063860 A1 | 3/2010 | Gallion |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1* | 1/2011 | Barber-Mingo ....... G06Q 10/06 709/206 |
| 2011/0054968 A1 | 3/2011 | Galaviz |
| 2011/0055177 A1 | 3/2011 | Chakra |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0107333 A1 | 5/2011 | Kapoor |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0018952 A1 | 1/2013 | Mcconnell |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |

(56) References Cited

U.S. PATENT DOCUMENTS

| | | |
|---|---|---|
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0223069 A1 | 8/2017 | Arora |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0344931 A1* | 11/2017 | Shenk ................... G06F 3/0481 |
| 2017/0346861 A1 | 11/2017 | Pearl |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0109421 A1* | 4/2018 | Laribi ................. H04L 43/0817 |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367483 A1 | 12/2018 | Rodriguez |
| 2018/0373804 A1 | 12/2018 | Zhang |
| 2019/0005048 A1 | 1/2019 | Crivello |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Patrick |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0328906 A1 | 10/2020 | Raghavan |
| 2020/0344253 A1 | 10/2020 | Kurup |
| 2020/0358628 A1 | 11/2020 | Achyuth |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |

(56) References Cited

U.S. PATENT DOCUMENTS

2022/0207489 A1  6/2022  Gupta
2022/0239516 A1  7/2022  Iyer

FOREIGN PATENT DOCUMENTS

| CN | 101339642 B | * | 12/2011 | |
| CN | 102378975 B | * | 5/2015 | ........... G06Q 10/087 |
| WO | WO-2015036817 A1 | * | 3/2015 | ............. H04L 51/32 |
| WO | WO-2015123751 A1 | * | 8/2015 | ............. G06Q 30/02 |
| WO | WO-2016033493 A1 | * | 3/2016 | ....... G06F 17/30294 |
| WO | 2020006634 A1 | | 1/2020 | |

OTHER PUBLICATIONS

Dawei Li, "Deepcham: Collaborative Edge-Mediated Adaptive Deep Learning for Mobile Object Recognition", 2016, IEEE/ACM, pp. 64-76. (Year: 2016).*

Peter Wurman, "Coordinating Hundreds of Cooperative, Autonomous Vehicles in Warehouses," 2008, AI Magazine, vol. 29, No. 1, pp. 9-19. (Year: 2008).*

Sara Perez-Soler, "Towards Conversational Syntax for Domain-Specific Languages using Chatbots", 2019, Journal of Object Technology, vol. 18, No. 2, pp. 5:1-21. (Year: 2019).*

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

www.asana.com (as retrieved from https://web.archive.Org/web/20160101054536/https://asana.com/press and https://web.archive.org/web/20160101054527/https://asana.com/product) (Year: 2016) 15 pages.

Hartmann, "TimeProjectscheduling with resource capacities and requests varying with time: a case study," 2013, Flexible services and manufacturing journal, vol. 25, No. 1, pp. 74-93 (Year: 2013).

Paul Minors, How to automate your tasks, youtube excerpts, Oct. 18, 2019 https://www.youtube.com/watch?v=IwF9XyUQrzw (Year: 2019).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Asset, F., Cassius, T. S., & Maria, T. S. (2018). Confrontation between techniques of time measurement. Journal of Manufacturing Technology Management, 29(5), 789-810. (Year: 2018).

Command and control, wikipedia, archives org, Mar. 16, 2018 https://web.archive.org/web/20180316193655/https://en.wikipedia.org/wiki/Command_and_control (Year: 2018), 6 pages.

"How to Asana: Inviting teammates to Asana." YouTube, Asana, Mar. 21, 2017, https://www.youtube.com/watch?v=TLOruY1KyxU (Year: 2017), 13 pages.

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

How to Asana Asana time tracking, youtube, excerpt, May 24, 2017 https://www.youtube.com/watch?v=z91qIex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resource s/infosheets/where-does-asana-fit (Year: 2017) (5 pages).

www.cogmotive.com/blog/author/alan Alan Byrne: "Creating a company Shared Calendar in Office 365"; pp. 1-17; Sep. 10, 2013.

Tiburca, Andrew) Best Team Calendar Applications for 2018-Toggl https://toggl.com/blog/best-team-calendar-applications-for-2018 (Year: 2017).

(56) References Cited

OTHER PUBLICATIONS

Macro, computer science, Wikipedia, archives org Feb. 11, 2020 http://web.archive.org/web/20200211082902/https://en.wikipedia.org/wiki/Macro_(computer_science) (Year: 2020).

* cited by examiner

SYSTEMS AND METHODS TO ATTRIBUTE AUTOMATED ACTIONS WITHIN A COLLABORATION ENVIRONMENT

FIELD OF THE DISCLOSURE

The present disclosure relates to systems and methods to attribute automated actions within a collaboration environment.

BACKGROUND

Collaboration environments, sometimes referred to as integrated collaboration environments, may enable users to assign projects, tasks, and/or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

One aspect of the present disclosure relates to a system configured to attribute automated actions within a collaboration environment. Collaboration environments may allow users to automate sequences of actions in response to trigger events. The automated actions and/or trigger events may be user specified and stored in automation records. Automated actions may take place within the collaboration environment and/or outside the collaboration environment (e.g., through one or more external applications). Trigger events may include events taking place within the collaboration environment and/or outside the collaboration environment. Automation of actions may cause confusion for users and/or may cause other errors or difficulties within the collaboration environment. For example, a user implementing another user's automation record may be unsure or unclear about the source (e.g., the creator) of the automation record. If the creator is unknown, it may be difficult to discuss the purpose of an automated action, discuss occurrence of possible errors, and/or otherwise engage with the creator. A user may create an automation record which may be limited by their own permissions within the system. Accordingly, one or more implementations of the systems and methods presented herein may provide a technique to attribute automated actions within the collaboration environment to creator(s) of the automated actions through presentation of one or more attribution labels. An attribution label may include one or more of a depiction of an avatar of a creator, a name and/or username of the creator, and/or other information. In some implementations, it may be desired to merely provide an indication that one or more actions were carried out via an automation, without necessarily attributing the one or more actions to a specific user/creator. In such instances, an attribution label may indicate that an action was completed through an automation and/or may be devoid of a particular identification of a creator.

One or more implementations of a system configured to attribute automated actions within a collaboration environment may include one or more hardware processors configured by machine-readable instructions. The processor(s) may be configured to manage environment state information maintaining a collaboration environment. The collaboration environment may be configured to facilitate interaction by users with the collaboration environment. The environment state information may include one or more of attribution information, automation records, and/or other information. The automation records may specify automated actions to carry out in response to trigger events. An individual automation record may define one or more trigger events, one or more automated actions to carry out in response to occurrence of the one or more trigger events, and/or other information. In some implementations, automated actions may be effectuated within a collaboration environment based on trigger events occurring within the collaboration environment. In some implementations, automated actions may be effectuated outside the collaboration environment based on trigger events occurring within the collaboration environment. In some implementations, automated actions may be effectuated within a collaboration environment based on trigger events occurring outside the collaboration environment. In some implementations, automated actions may be effectuated outside a collaboration environment based on trigger events occurring outside the collaboration environment. The attribution information may indicate individual creators of individual automation records and/or may specify other information.

The processor(s) may be configured to detect occurrence of the trigger events. By way of non-limiting illustration, an occurrence of the first trigger event may be detected. In some implementations, the first trigger event may be specified by a first automation record. The first automation record may define a first automated action to carry out in response to the first trigger event.

The processor(s) may be configured to effectuate automated actions corresponding to detected occurrences of the trigger events. By way of non-limiting illustration, the first automated action may be effectuated in response to the occurrence of the first trigger event.

The processor(s) may be configured to effectuate presentation of attribution labels for effectuated ones of the automated actions. The attribution labels may be generated based on the attribution information. By way of non-limiting illustration, presentation may be effectuated of a first attribution label for the first automated action. In some implementations, the first attribution label may include one or more of an avatar of a first creator of the first automation record, a username and/or name of the first creator of the first automation record, and/or other information. In some implementations, the first attribution label may be devoid of an indication of the first creator.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
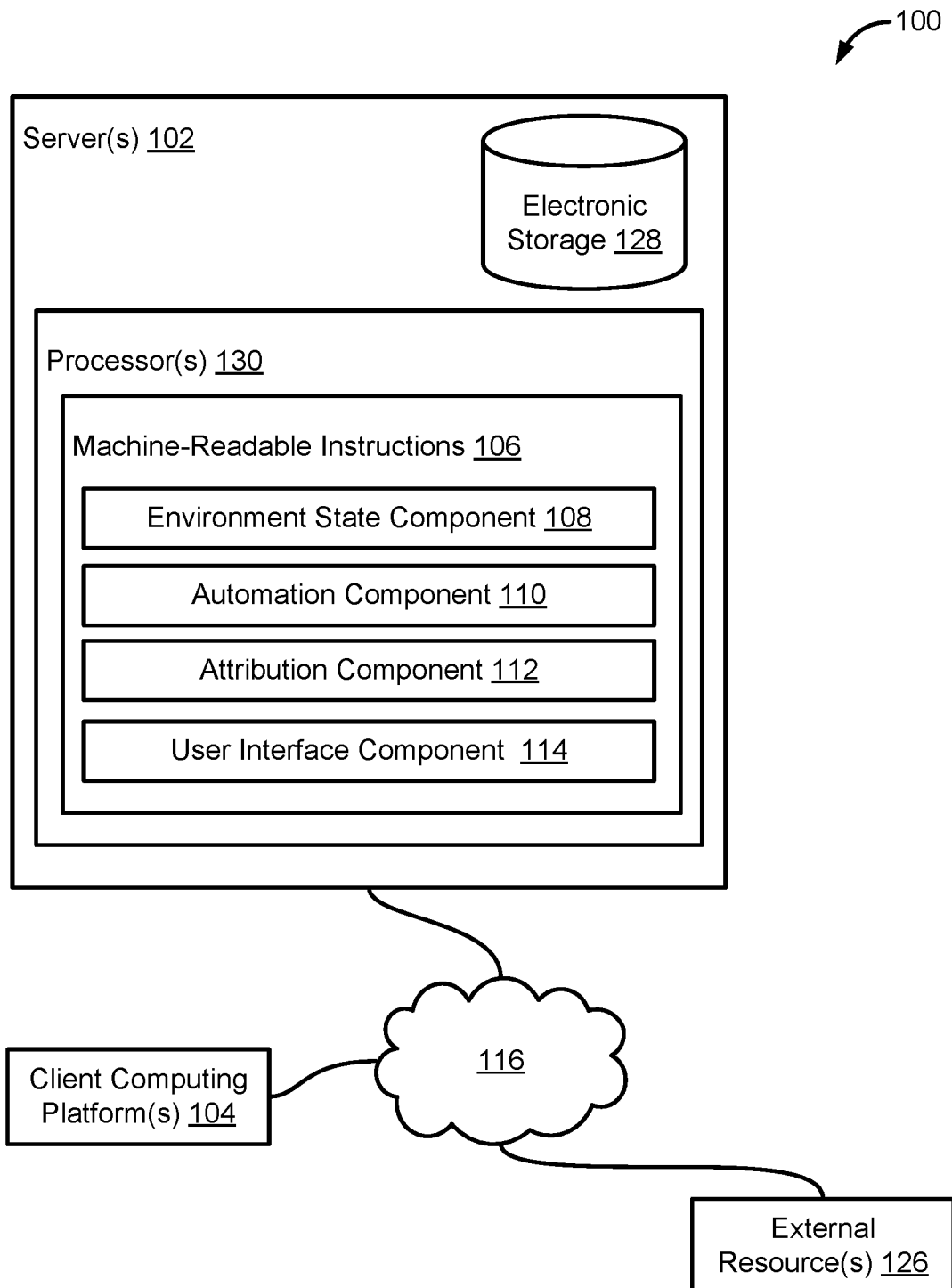
FIG. 1 illustrates a system configured to attribute automated actions within a collaboration environment, in accordance with one or more implementations.

FIG. 1 illustrates a system 100 configured to attribute automated actions within a collaboration environment, in accordance with one or more implementations. One or more implementations of the systems and methods presented herein may provide a technique to attribute automated actions to creator(s) of the automated actions through presentation of one or more attribution labels. An attribution label may include one or more of a depiction of an avatar of a creator, a name of the creator, a username of the creator, and/or other information. In some implementations, it may be desired to merely provide an indication that one or more actions were carried out via an automation (as opposed to manually by a user), without necessarily attributing the one or more actions to a specific user/creator. In such instances, an attribution label may indicate that an action was completed through an automation and/or may be devoid of a particular identification of a creator (e.g., via an avatar, a name, a username, and/or other information).

In some implementations, system 100 may include one or more of one or more servers 102, one or more client computing platforms 104, one or more external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, individual external resources of one or more external resources 126 may include individual applications providing one or more services outside of system 100. An application may include one or more of a calendar application, a payment application, an electronic communication application, a social media application, restaurant-reservation application, on-demand delivery application, a project management application, a customer relationship management application, a ticketing application, a partner relationship management application, a web form application, and/or other applications outside of the system providing one or more services.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate attributing automated actions within a collaboration environment. The instruction components may include one or more of an environment state component 108, an automation component 110, an attribution component 112, a user interface component 114, and/or other instruction components.

Environment state component 108 may be configured to manage environment state information and/or other information used in maintaining a collaboration environment. Managing may include one or more of obtaining, sending, receiving, storing, updating, deleting, archiving, reporting, and/or other processes. The environment state information may include one or more of values of one or more environment parameters, permission records, automation records, attribution information, and/or other information. The environment parameters may include one or more of user parameters, work unit parameters, work status parameter(s), and/or other parameters. The values of the user parameters may specify user information and/or other information. The values of the work unit parameters may specify work information and/or other information.

The values of the user parameters may be organized in user records corresponding to users interacting with and/or viewing the collaboration environment. The values of the user parameters associated with the users interacting with and/or viewing the collaboration environment may include information describing the users, user actions of the users within the collaboration environment, their settings, and/or other user information; and/or metadata associated with the users, their settings, and/or other user information. Individual ones of the users may be associated with individual ones of the user records. A user record may define values of the user parameters associated with a given user interacting with and/or viewing the collaboration environment.

The values of the user parameters may, by way of non-limiting example, specify one or more of: a legal name, a username, a group parameter, a user account, a user role, a user department, descriptive user content, a to-email, a from-email, a photo, an organization, a workspace, one or more projects (which may include project parameters defined by one or more work unit records), one or more portfolios of projects, one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more units of work the user is associated with (units of work assigned to the user, assigned to other users by the user, completed by the user, past-due date, and/or other information), application access information (e.g., username/password for one or more third-party applications), one or more favorites and/or priorities, and/or other information for the given user.

The values of the work unit parameters may be organized in work unit records corresponding to units of work managed, created, and/or assigned within the collaboration environment. A given unit of work may have one or more assignees and/or team members working on the given unit of work. Units of work may include one or more of projects, tasks, sub-tasks, to-do items, action items, objectives, and/or other units of work one or more users should accomplish and/or plan on accomplishing. Units of work may be created by a given user for the given user and/or created by the given user and assigned to one or more other users.

By way of non-limiting illustration, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, the units of work may be described based on one or more of a unit of work name, a unit of work description, one or more unit of work dates (e.g., a start date, a due date, a completion date, and/or dates), one or more members associated with a unit of work (e.g., a creator, one or more other project/task members, member access information, an assignor, an assignee, and/or other information), a status parameter (e.g., an update, a hardcoded status update, a completed/uncomplete/mark complete, a measured status, a progress indication, quantity of sub-work units remaining for a given unit of work, completed units of work in a given project, and/or other status parameter), one or more user comment parameters (e.g., permission for who may comment such as a creator, a recipient, one or more followers, and/or one or more other interested parties; content of the comments; one or more times; presence or absence of the functionality of up-votes; one or more hardcoded responses; and/or other parameters), one or more interaction parameters (e.g., indicating a given unit of work is being worked on/was worked on, a given unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy settings, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), dependencies between one or more units of work, one or more custom fields (e.g., priority, cost, stage, and/or other custom fields), and/or other values of work unit parameters.

The values of the work assignment parameter describing units of work assigned to the individual users may be determined based on one or more interactions by one or more users with a collaboration environment. In some implementations, one or more users may create and/or assign one or more units of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, user actions within the collaboration environment may include effectuating one or more changes in one or more values of one or more of the environment parameters. User actions may be facilitated through a user interface presenting the collaboration environment. By way of non-limiting illustration, a user action may include marking a unit of work "complete." Marking a unit of work complete may change a value of a work unit parameter for the unit of work from "incomplete" to "marked complete." User actions may include other changes to other values of other environment parameters described herein.

The environment state information may include individual work status values of a work status parameter of the individual users. An individual work status value of the work status parameter of an individual user may specify whether the individual user is active or inactive in the collaboration environment. In some implementations, "active" may refer to a user who is currently employed. In some implementations, "inactive" may refer to a user who is no longer employed, on a leave of absence, and/or other considerations. By way of non-limiting illustration, the environment state information may include a first work status value for a first creator of a first automation record.

In some implementations, individual sets of automated actions and associated individual trigger events may be stored in individual automation records. A set of automated actions may include one or more automated actions. In some implementations, the term "creator" may refer to a user of the system 100 who has created an automation record. An automation record may define one or more of individual actions, individual trigger events, and/or other information. Individual actions may be defined by a target component, an action component, and/or other information. The target component of an automation record may include the environment parameter (or parameters) to which an action is to be carried out on and/or an external resource to which the action is to be carried out with. The action component of an automation record may define what change is to be made on the environment parameter(s) and/or instructions to effectuate the action by the external resource defined by the target component.

In some implementations, effectuating individual automated actions outside the collaboration environment may include communicating instructions to effectuate the action to an external resource outside the collaboration environment. In some implementations, effectuating automated actions outside the collaboration environment may include performing an application programming interface (API) call and/or other interaction with the external resource to cause the external resource to execute one or more routines in accordance with the instructions. An API interaction may include one or more of Remote Procedure Call, Representational State Transfer, GraphQL, and/or other interactions.

Individual trigger events may be defined by a source component, an event component, and/or other information. The source component of an automation record may include the environment parameter(s) and/or external resource(s) from which occurrences of a trigger event may be derived. The event component may include the value (or change in the value) for the environment parameter(s) and/or the information indicating occurrence of an event within the external resource defined by the source component from which occurrences of a trigger event may be derived.

Information indicating occurrence of trigger events outside the collaboration environment may be obtained by virtue of individual external resources communicating the information to system 100. The communicated information may include status reports and/or other information. In some implementations, the communication of the information may be based on the system 100 sending requests for the information. In some implementations, the communication of the information may be based on individual external resources performing scheduled and/or predetermined reporting protocols (e.g., push notifications and/or other protocols).

In some implementations, individual automation records may store counts of occurrences of individual trigger events and/or occurrences of carrying out individual automated actions in the sets of automated actions.

In some implementations, individual automation records may include individual automation status values of an automation status parameter of the individual automation records. An individual automation status value of the automation status parameter of an individual automation record may specify whether the individual automation record is active or disabled. An automation status value of "active" may mean that an automation record may be effectuated. An automation status value of "disabled" may mean that an automation record may not be effectuated.

The automation component 110 may be configured to determine whether individual automation records are active or disabled based on individual automation status values of the automation status parameter. The individual automation status values of the automation status parameter of the individual automation records may be determined based on the individual work status values of the work status parameter of the individual creators. By way of non-limiting illustration, responsive to the first work status value specifying the first creator is active in the collaboration environment, a first automation status value of the first automation record may specify the first automation record is active. By way of non-limiting illustration, responsive to the first work status value specifying the first creator is inactive in the collaboration environment, the first automation status value of the first automation record may specify the first automation record is disabled.

In some implementations, the automation component 110 may be configured to reassign individual automation records to other individual users responsive to the individual work status values specifying the individual creators are inactive in the collaboration environment. The other users may include users having the individual work status values specifying they are active in the collaboration environment. The other users may include users having the same or similar role as the inactive user. By way of non-limiting illustration, responsive to the first work status value specifying the first creator is inactive in the collaboration environment, the automation component 110 may be configured to reassign the first automation record to a second user having a second work status value specifying the second user is active in the collaboration environment. In some implementations, the automation component 110 may be configured to effectuate communication of one or more notifications to the newly reassigned users prior to, during, and/or after the reassignment. Notifications may be communicated within system 100 (e.g., internal message and/or notification) and/or outside of system 100 (e.g., email, SMS message, and/or other considerations).

Permission records for individual users may specify individual sets of permissions within the collaboration environment and/or outside the collaboration environment. An individual permission record for an individual user may specify whether the individual can carry out certain actions within the collaboration environment and/or outside the collaboration environment. If a user is deemed to have permission, the user may be permitted to carry out the actions within the collaboration environment and/or outside the collaboration environment. If a user is deemed to not have permission, the user may not be permitted to carry out the actions within the collaboration environment and/or outside the collaboration environment.

One or more permissions to carry out certain actions within the collaboration environment may refer to one or more of ability to access one or more records (e.g., user record, work unit record, automation record, and/or other records), ability to change one or more values of one or more environment parameters (e.g., perform a state change), ability to change, set, and/or otherwise specify one or more environment parameters to one or more specific values (e.g., perform a particular data state change), and/or other actions within the collaboration environment. By way of non-limiting illustration, a set of permissions of the first creator may specify one or more of a first permission, a second permission, a third permission, and/or other permissions. In some implementations, the first permission may specify the first creator has access to a first user record, the second permission may specify the first creator does not have the ability to change the value of a first work unit parameter, and/or the third permission may specify the first creator does have the ability to set values of a second work unit parameter to one or more of a first value, a second value, a third value, or a fourth value (but no other values). It is noted that the above description of permission within the collaboration environment is for illustrative purposes only and not to be considered limiting. Permissions within the collaboration environment may relate to other parameters described herein and/or other features and/or functionality within the scope of this disclosure.

One or more permissions to carry out certain actions outside the collaboration environment may refer to one or more of ability to access one or more external resources 126, ability to cause one or more external resources 126 to perform one or more actions, ability to cause one or more specific actions to be carried out by one or more external resources 126, and/or other actions outside the collaboration environment. By way of non-limiting illustration, the set of permissions of the first creator may further specify one or more of a fourth permission, a fifth permission, a sixth permission, and/or other permissions. In some implementations, the fourth permission may specify the first creator does not have access to a payment application, the fifth permission my specify the first creator has the ability to control a project management application, and/or the sixth permission may specify the first creator has the ability to perform a specific action in a social media application (e.g., the specific action being post content, but not comment, follow, etc.). It is noted that the above description of permission outside the collaboration environment is for illustrative purposes only and not to be considered limiting. Permissions outside the collaboration environment may relate to other external applications and/or other features and/or functionality within the scope of this disclosure.

The attribution information may indicate individual creators of individual automation records. In some implementations, the attribution information may include one or more transparency values of a transparency parameter and/or other information. An individual transparency value of the transparency parameter may specify whether individual automated actions are attributed to the individual creators of the individual automation records. By way of non-limiting illustration, the attribution information may indicate the first creator of the first automation record and/or other information. The attribution information may include a first transparency value of the transparency parameter for the first creator. In some implementations, the first transparency value may specify the first automated action is attributed to the first creator. In some implementations, the first transparency value may specify the first automated action is not attributed to the first creator.

The automation component 110 may be configured to generate automation information and/or other information. The automation information may be generated based on user entry and/or selection of the automation information into a user interface. The automation information may specify sets of automated actions to carry out in the collaboration environment in response to occurrence of trigger events. The user entry and/or selection of the automation information may include entry and/or selection of one or more of individual automated actions in individual sets of automated actions, individual trigger events, and/or other information. The generation of automation information may result in the creation of individual automation records.

The automation component 110 may be configured to detect occurrence of the trigger events based on changes in the values of the environment parameters and/or other information. Detection may be based on monitoring environment state information, user actions, and/or other components of system 100. In some implementations, individual trigger events may be specified as individual occurrences of change of the values of the environment parameters. Occurrences of change may convey a state change of an environment parameter. The state change may not consider what the change is, but instead that a change occurred. For example, a trigger event may include an occurrence of a reassignment of a unit of work from one user to an other user.

In some implementations, individual trigger events may be specified as individual values of the environment parameters. Changes to specific values may be referred to as data state changes. The data state change may refer to a change of a parameter to a specific value from an other value (and/or from a state of being unspecified). For example, a trigger event may include an occurrence of a reassignment of a unit of work from one user to another specific user. For example, a trigger event may include a comment having one or more specific words and/or phrases.

The automation component 110 may be configured to obtain information indicating occurrence of trigger events outside the collaboration environment. In some implementations, information indicating occurrence of trigger events outside the collaboration environment may be obtained by virtue of individual external resources communicating the information to system 100. The communicated information may include status reports and/or other information. In some implementations, the communication of the information may be based on automation component 110 sending requests for the information. In some implementations, the communication of the information may be based on individual external resources performing scheduled and/or predetermined reporting protocols (e.g., push notifications and/or other protocols).

By way of non-limiting illustration, automation component 110 may be configured to detect an occurrence of a first trigger event. The first trigger event may be defined by the first automation record defining a first automated action and/or other automated actions to carry out in response to the first trigger event.

The automation component 110 may be configured to, responsive to the detection of the occurrence of individual trigger events, effectuate individual automated actions and/or sets of automated actions. By way of non-limiting illustration, automation component 110 may be configured to effectuate first automated action and/or other actions in response to the occurrence of the first trigger event and/or other events.

In some implementations, an individual automated action may include effectuating one or more of creation of, change in, and/or specification of, one or more values of one or more of the environment parameters. In some implementations, the creation of, change in, and/or specification of values of environment parameters may be accomplished by accessing a corresponding record (e.g., user record, work unit record, and/or other records). In some implementations, creation of, change in, and/or specification of an individual value may be reflected in views of the collaboration environment accessed by users. The views in the collaboration environment showing the creation of, change in, and/or specification of an individual value may further include views of attribution labels (see, e.g., attribution component 112).

In some implementations, an individual automated action may be carried out simultaneously (or near simultaneously) with an individual detection of an individual occurrence of an individual trigger event and/or within a specified time frame following an individual detection of an individual occurrence of an individual trigger event. In some implementations, a specified time frame may include a "waiting" period of time before an action is carried out. In some implementations, the waiting period of time may be satisfied by one or more of the passage of the period of time, some other trigger event, and/or other events and/or actions within the collaboration environment.

In some implementations, a set of automated actions may be associated with one or more of a sequence in which automated actions in the set are to be carried out, concurrent carrying out of two or more of the automated actions in the set, and/or other features and/or functionality. The automated actions within a set of automated actions may have a specified ordered sequence in which the automated actions are to be carried out. In some implementations, one or more actions may be followed by, and/or preceded by, a specified waiting period. A set of automated actions may specify that two or more actions may be carried out concurrently.

In some implementations, automated actions outside the collaboration environment may be effectuated by communicating instructions to an external resource outside the collaboration environment. In some implementations, effectuating individual sets of automated actions outside the collaboration environment may include performing an application programming interface (API) call and/or other interactions with the external resource to cause the external resource to execute one or more routines in accordance with the instructions. An API interaction may include one or more of Remote Procedure Call, Representational State Transfer, GraphQL, and/or other interactions.

It is noted that while some descriptions presented herein may be directed to an individual trigger event causing an individual set of automated actions to be carried out within the collaboration environment, this is for illustrative purposes only and not to be considered limiting. For example, in some implementations, multiple trigger events may be combined together through some logic criteria, that when satisfied, may cause an individual set of automated actions to be carried out within the collaboration environment. Logic may include, for example, Boolean logic. By way of non-limiting illustration, logic operators such as "AND", "OR", "NOT", and/or other operations may be utilized to generate more complex trigger combinations for sets of automated actions. In some implementations, the use of logic operators may allow for fewer discrete trigger events to be defined yet still have more complex behavior available to users. For example, there may not need to specify a trigger event of "when task is unassigned", since through the use of a logic operator "NOT", a trigger event may be defined by "when task assigned" combined with the operator "NOT". Further, the Boolean logic may facilitate multistage automation. By way of non-limiting illustration, instead of input "than-if-then" or "if-and-if-then", logic may include "if-then-then" and/or other operators. In some implementations, a user may specify a set, or pool, of trigger events to trigger one or more automated actions. In some implementations, user may specify that one or more of the trigger events in the set may individually and/or in combination trigger the one or more automated actions. This way, a user may specify multiple options of trigger events which may trigger one or more automated actions. Further, an individual trigger event may trigger multiple automated actions.

Attribution component 112 may be configured to effectuate presentation of attribution labels for effectuated ones of the automated actions. Individual attribution labels may be presented on a user interface displaying the collaboration environment. An attribution label may include one or more of a graphical icon, text, and/or other information. The individual attribute labels may be presented on the user interface reflecting the effectuated ones of the automated actions. In some implementations, attribution labels may include identifications of creators and/or other information. An attribution label may include an identification of a creator by one or more of a depiction of an avatar of a creator, a name and/or username of the creator, and/or other information. In some implementations, an attribute label may identify a current user (sometimes referred to as an "owner") of the automation record (e.g., a user implementing an automation record as part of their workflow).

In some implementations, an attribution label may be devoid of an identification of a creator. An attribution label devoid of an identification of a creator may include default information. The default information may include one or more of a depiction of a generic avatar (e.g., not associated with a creator and/or other users), text, and/or other information. Text may include words and/or phrases. A phrase may include, for example, "This is an automated action" and/or variations thereof.

By way of non-limiting illustration, attribution component 112 may be configured to effectuate presentation of a first attribution label for the first automated action. In some implementations, the first attribution label may include an identification of the first creator. In some implementations, the first attribution label may include an identification of the first creator by one or more of a depiction (e.g., graphical icon) of an avatar of the first creator, a name and/or username of the first creator, and/or other information. In some implementations, the first attribution label may be devoid of an identification of the first creator.

The attribution labels may be generated based on one or more of attribution information, permission records, and/or other information.

In some implementations, transparency values of the transparency parameter included in the attribution information may specify whether individual automated actions are attributed to the individual creators of the individual automation records. By way of non-limiting illustration, responsive to the first transparency value specifying the first automated action is attributed to the first creator, the first attribution label may include an identification of the first creator. By way of non-limiting illustration, responsive to the first transparency value specifying the first automated action is not attributed to the first creator, the first attribution label may be devoid of an identification of the first creator.

The attribution component 112 may be configured to access permission records of the individual creators of the individual automation records to determine attribution labels. The attribution component 112 may be configured to determine whether the individual automated actions and/or other components of the individual automation records fall within the individual sets of permissions of the individual creators. "Falling within" the individual sets of permission may refer to an automated action being able to be carried out by virtue of an individual user having a specific permission which would allow the automated action to be carried out. If an individual user does have a specific permission which would allow the automated action to be carried out, a determination may be made that an automated action falls within a set of permissions. If an individual user does not have a specific permission which would allow the automated action to be carried out (e.g., but instead generally has permission to carry out the automated action and/or is otherwise not restricted), a determination may be made that an automated action does not fall within a set of permissions. If an automated action falls within a set of permissions, this may be considered a "private" automation record. If an automated action does not fall within a set of permission, this may be considered a "public" automation record. If an automated action falls within a set of permissions, the automated action may be attributed to the particular user. If an automated action does not fall within a set of permission, the automated action be devoid of an attribution to the particular user.

Determining whether the individual automated actions of the individual automation records fall within the individual sets of permissions may include comparing individual components of an automation record (e.g., one or more of target component, an action component, a source component, an event component, and/or other information) with individual permissions. In some implementations, when one or more of the components of an automation record are specifically allowed due to one or more permissions in the set of permissions of a creator, it may be determined that individual automated actions of the automation record fall within the set of permissions. In some implementations, when one or more of the components of an automation record are not specifically allowed by one or more permission in the set of permissions of a creator, it may be determined that individual automated actions of the automation record do not fall within the set of permissions.

It is noted that the above description of determining whether the individual automated actions and/or other components of the individual automation records fall within the individual sets of permissions of the individual creators is different from determining whether the individual automated actions are affirmatively restricted by one or more permissions. In such a case, the automation record would be considered void insofar that the process of determining whether to attribute actions of the record to a creator would be irrelevant (up to and/or until the automation record is corrected to be valid).

The attribution component 112 may be configured to generate the attribution labels based on the determination of whether the individual automated actions of the individual automation records fall within the individual sets of permissions of the individual creators.

In some implementations, responsive to determinations that the individual automated actions of the individual automation records fall within the individual sets of permissions of the individual creators, attribution component 112 may be configured to generate the attribution labels to include the identifications of the individual creators. By way of non-limiting illustration, responsive to a determination that the first automated action falls within the first permission of the first creator, the first attribution label may include an identification of the first creator.

In some implementations, responsive to determinations that the individual automated actions of the individual automation records do not fall within the individual sets of permissions of the individual creators, attribution component 112 may be configured to generate the attribution labels to be devoid of the identifications of the individual creators. By way of non-limiting illustration, responsive to a determination that the first automated action does not fall within the first permission of the first creator, the first attribution label may be devoid of an identification of the first creator.

User interface component 114 may be configured to effectuate presentation of individual user interfaces on individual client computing platforms of one or more client computing platforms 104. Individual client computing platforms may access a user interface over network 116. A given user interface may be configured to facilitate one or more of presentation of the collaboration environment, specification of sets of automated actions and/or trigger events, specification of transparency values, and/or other information.

The user interface component 114 may be configured to effectuate presentation of a user interface through which users may specify and/or select one or more of one or more automated actions, one or more trigger events, one or more transparency values, and/or other information.

A user interface may include one or more user interface portions. A user interface may include one or more input portions, one or more display portions, and/or other components. Individual portions may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction.

A display portion may include views of the collaboration environment. In some implementations, views of the collaboration environment may reflect units of work and/or one or more of creation of, change in, and/or specification of one or more values of environment parameters. In some implementations, views of the collaboration environment may include one or more dashboards displaying units of work. A dashboard may include a timeline and/or Gantt chart view of one or more units of work. The units of work may be arranged by date according to a timeline. A timeline may include a graphical representation of the passage of time via a series of hours, days, weeks, months, and/or years. In some implementations, a dashboard may include one or more unit of work views. A unit of work view may include a display window providing a representation of a unit of work. A unit of work view may display values of one or more work unit parameters of the unit of work. By way of non-limiting illustration, a unit of work view may include a set of display portions and/or input portions. The set of display portions may include individual portions including values of individual work unit parameters. By way of non-limiting illustration, a unit of work view may include one or more of a first display portion displaying a name of the unit of work, a second display portion displaying a description of the unit of work, a third display portion displaying a due date of the unit of work, a fourth display portion showing a comment thread of the unit of work, and/or other information.

In some implementations, individual attribution labels many be presented on a user interface displaying the collaboration environment. In some implementations, the individual attribute labels may be presented at individual portions of the user interface reflecting the effectuated ones of the automated actions. By way of non-limiting illustration, a new unit of work may be created through an automation record. The new unit of work may be viewable in a display window of a unit of work view of the collaboration environment. An attribution label may be presented in the display window. By way of non-limiting illustration, a unit of work may be marked complete through an automation record. A timeline view showing the unit of work along a timeline may automatically change to remove the view of the unit of work in response to being marked complete. An attribution label may be presented at or near the timeline indicating that that the unit of work has been marked complete through an automation record and/or may indicate a creator of the automation record.

Figure 3:
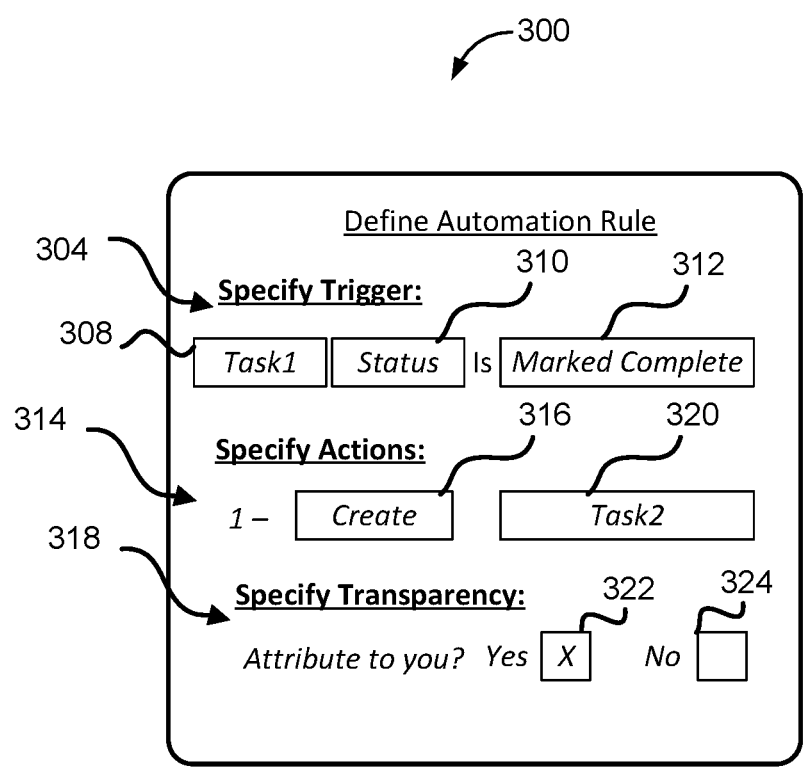
FIG. 3 illustrates an exemplary user interface, in accordance with one or more implementations.

FIG. 3 illustrates an exemplary user interface 300, in accordance with one or more implementations. The user interface 300 may be configured to obtain user entry and/or selection of automation information, transparency values, and/or other information. The user entry and/or selection may be in the form of specification of automated actions, trigger events, specific transparency values (e.g., indicating a "yes" or a "no"), and/or other information. Automated actions may be specified based on entry and/or selection of environment parameters to carry out actions on, entry and/or selection of values to apply to the entered and/or selected environment parameters, and/or other information. Trigger events may be specified based on one or more of entry and/or selection of environment parameters associated with trigger events, entry and/or selection of values of environment parameters associated with trigger events, and/or other information.

The user interface 300 may include a trigger input portion 304 to obtain entry and/or selection of a trigger event. The trigger input portion 304 may include a user interface element 308 configured to obtain information identifying a unit of work associated with the trigger event, a user interface element 310 configured to obtain entry and/or selection of an environment parameter associated with the trigger event, and a user interface element 312 configured to obtain entry and/or selection of a value for the environment parameter associated with the trigger event. For illustrative purposes, the trigger event in FIG. 3 may refer to the status of the task named "Task1" being "marked complete."

The user interface 300 may include an automated action input portion 314 to obtain entry and/or selection of a set of automated actions. The automated action input portion 314 may include a user interface element 316 configured to obtain entry and/or selection of a first environment parameter associated with a first automated action and a user interface element 320 configured to obtain entry and/or selection of a first value for the first environment parameter. For illustrative purposes, the first environment parameter may include a work unit parameter for creating a unit of work and the first value may include a name value of "Task2." Accordingly, the first automated action may refer to creating a unit of work with the name "Task2" in response to "Task1" being "marked complete."

The user interface 300 may include a transparency input portion 318 to obtain entry and/or selection of a transparency value for the current automated action. The transparency input portion 318 may include a user interface element 322 configured to obtain entry and/or selection of a first value (e.g., "yes" meaning the automated action will be attributed to the creator, a user interface element 324 configured to obtain entry and/or selection of a second value (e.g., "no" meaning the automated action may not be attributed to the creator), and/or other elements.

It is noted that FIG. 3 is for illustrative purposes only and is not to be considered limiting. Instead, it is to be understood that the user interface 300 may be configured in other ways and/or including other elements in accordance with one or more implementations of the system 100 presented herein.

Figure 4:
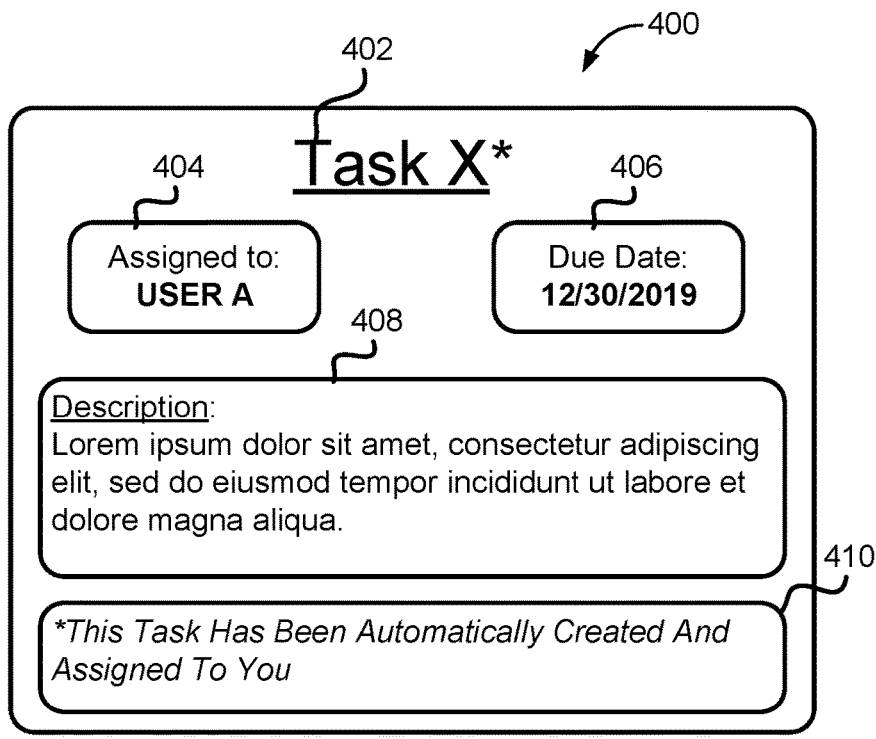
FIG. 4 illustrates an exemplary user interface, in accordance with one or more implementations.

FIG. 4 illustrates an exemplary user interface 400 showing an attribution label 410 devoid of an identification of a creator, in accordance with one or more implementations. User interface 400 may include a unit of work view within a collaboration environment. User interface 400 may be a unit of work view showing a unit of work (e.g., "Task X") which may have been created and/or assigned to a user (e.g., User A) by virtue of one or more automated actions of an automation record. The user interface 400 may include one or more of a first display portion 402 displaying a name of the unit of work, a second display portion 404 displaying an assignee of the unit of work, a third display portion 406 displaying a due date of the unit of work, a fourth display portion 408 displaying a description of the unit of work, attribution label 410, and/or other information. The attribution label 410 may be devoid of an identification of a creator of the automation record and instead may include default information and/or other information. The default information may include a phrase.

Figure 5:
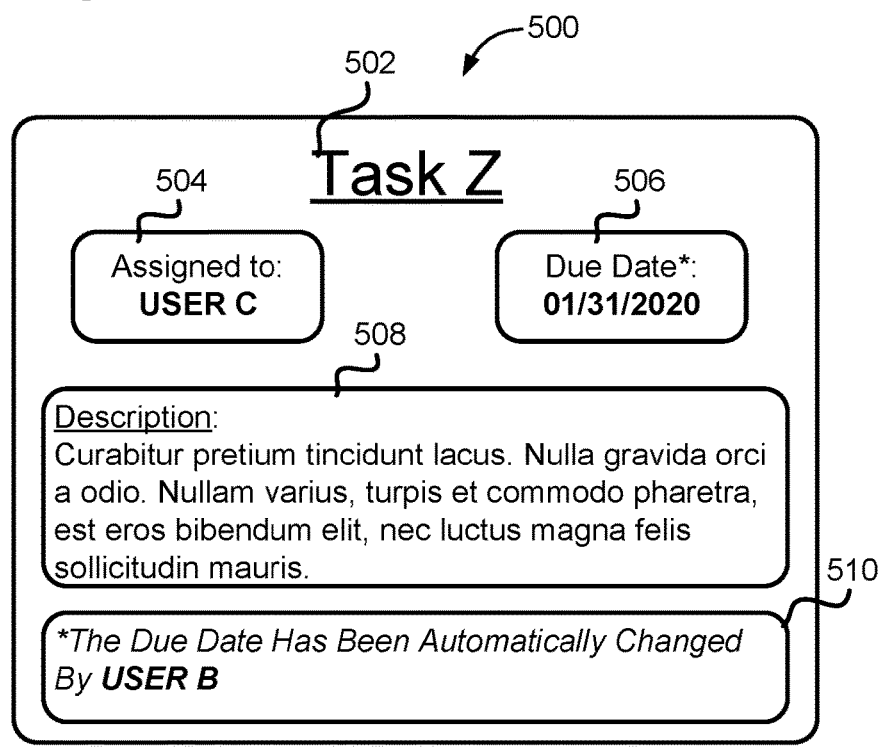
FIG. 5 illustrates an exemplary user interface, in accordance with one or more implementations.

FIG. 5 illustrates an exemplary user interface 500 showing an attribution label 510 including of an identification of a creator, in accordance with one or more implementations. User interface 500 may include a unit of work view within a collaboration environment. User interface 500 may be a unit of work view showing a unit of work having a due date which may have been automatically changed by virtue of one or more automated actions of an automation record created by a user (e.g., User B). The user interface 500 may include one or more of a first display portion 502 displaying a name of the unit of work, a second display portion 504 displaying an assignee of the unit of work, a third display portion 506 displaying a due date of the unit of work, a fourth display portion 508 displaying a description of the unit of work, attribution label 510, and/or other information. The attribution label 510 may include an identification of the creator by virtue of the attribute label 510 identifying the creator by username (e.g., User B).

Returning to FIG. 1, in some implementations, server(s) 102, client computing platform(s) 104, and/or external resource(s) 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connected to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
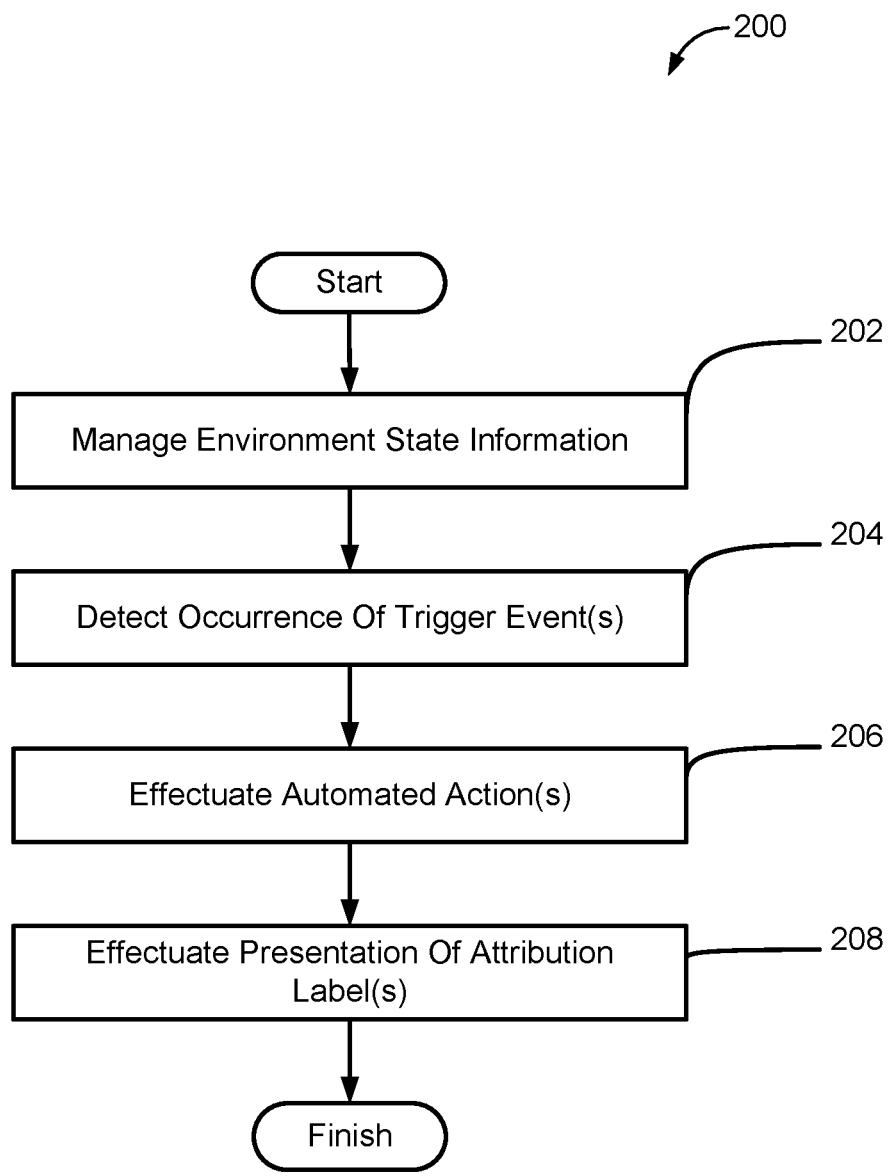
FIG. 2 illustrates a method to attribute automated actions within a collaboration environment, in accordance with one or more implementations.

FIG. 2 illustrates a method 200 to attribute automated actions within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include one or more of attribution information, automation records, and/or other information. The automation records may specify automated actions to carry out in response to trigger events. An individual automation record may define one or more trigger events, one or more automated actions to carry out in response to occurrence of the one or more trigger events, and/or other information. In some implementations, automated actions may be effectuated outside the collaboration environment based on trigger events occurring within the collaboration environment. In some implementations, automated actions may be effectuated within a collaboration environment based on trigger events occurring outside the collaboration environment. In some implementations, automated actions may be effectuated outside a collaboration environment based on trigger events occurring outside the collaboration environment. The attribution information may indicate individual creators of individual automation records and/or may specify other information. Operation 202 may be performed by one or more hardware processors configured by machine-readable instructions including a component that is the same as or similar to environment state component 108, in accordance with one or more implementations.

An operation 204 may detect occurrence of trigger events. By way of non-limiting illustration, an occurrence of the first trigger event may be detected. In some implementations, the first trigger event may be specified by a first automation record. The first automation record may define a first automated action to carry out in response to the first trigger event. Operation 204 may be performed by one or more hardware processors configured by machine-readable instructions including a component that is the same as or similar to automation component 110, in accordance with one or more implementations.

An operation 206 may effectuate automated actions corresponding to detected occurrences of the trigger events. By way of non-limiting illustration, the first automated action may be effectuated in response to the occurrence of the first trigger event. Operation 206 may be performed by one or more hardware processors configured by machine-readable instructions including a component that is the same as or similar to automation component 110, in accordance with one or more implementations.

An operation 208 may effectuate presentation of attribution labels for effectuated ones of the automated actions. The attribution labels may be generated based on the attribution information. By way of non-limiting illustration, presentation may be effectuated of a first attribution label for the first automated action. In some implementations, the first attribution label may include one or more of avatar of a creator of the first automation record, a username and/or name of the creator of the first automation record, and/or other information. In some implementations, the first attribution label may be devoid of an indication of the first creator. Operation 208 may be performed by one or more hardware processors configured by machine-readable instructions including a component that is the same as or similar to attribution component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method to attribute automated actions within a collaboration environment, the method being implemented in a computer system comprising one or more physical processors configured by machine-readable instructions, such that execution of the machine-readable instructions by the one or more physical processors causes the one or more physical processors to perform the method comprising:

managing, at a server, environment state information maintaining a collaboration environment, the collaboration environment facilitating interaction by users with the collaboration environment, the users interacting with the collaboration environment via remotely located client computing platforms communicating with the server over an Internet connection, the environment state information including attribution information and automation records for automated actions to carry out in response to trigger events, an individual automation record defining one or more of the trigger events and one or more of the automated actions to carry out in response to occurrence of the one or more of the trigger events, the attribution information indicating individual creators of individual ones of the automation records, such that the attribution information indicates a first user as a creator of a first automation record, the first automation record defining a first trigger event and a first automated action to carry out in response to the first trigger event;

establishing the Internet connection between the remotely located client computing platforms and the server;

effectuating communication of information from the server to the remotely located client computing platforms over the Internet connection so that the remotely located client computing platforms present a user interface of the collaboration environment;

identifying, at the server, the users who are implementing the automation records, including identifying a second user is implementing the first automation record created by the first user;

monitoring, by the server, the environment state information to detect occurrences of the trigger events based on the interactions by the users with the collaboration environment via the remotely located client computing platforms;

detecting, at the server and based on monitoring the environment state information, the occurrences of the trigger events, including detecting an occurrence of the first trigger event;

executing, by the server, the automated actions for the users implementing the automation records, the automated actions executed by the server corresponding to detected occurrences of the trigger events in the collaboration environment, including executing the first automated action in the collaboration environment for the second user in response to the occurrence of the first trigger event; and updating, based on the executing the automated actions, the information communicated from the server to the remotely located client computing platforms so that the user interface presented by the remotely located client computing platforms displays, for the users who are implementing the automation records, attribution labels for executed ones of the automated, wherein the attribution labels are generated based on the attribution information such that the attribution labels identify the individual creators of the individual ones of the automation records, including effectuating presentation of a first attribution label in the user interface of the collaboration environment for the second user, the first attribution label identifying the first user as the creator of the first automation record.

2. The method of claim 1, wherein the attribution information includes one or more transparency values of a transparency parameter, wherein an individual transparency value of the transparency parameter specifies whether the individual ones of the automated actions are attributed to the individual creators of the individual ones of the automation records, and wherein the attribution information further includes a first transparency value of the transparency parameter for the first automation record, including:

responsive to the first transparency value specifying the first automated action is attributed to the first user, the first attribution label includes an identification of the first user; and responsive to the first transparency value specifying the first automated action is not attributed to the first user, the first attribution label is devoid of an identification of the first user.

3. The method of claim 1, further comprising:

accessing permission records of the individual creators of the individual ones of the automation records, individual ones of the permission records of the individual creators specifying individual sets of permissions of the individual creators within the collaboration environment;

determining whether the individual ones of the automated actions of the individual ones of the automation records fall within the individual sets of permissions of the individual creators; and generating the attribution labels based on determination of whether the individual ones of the automated actions of the individual ones of the automation records fall within the individual sets of permissions of the individual creators, including:

responsive to determinations that the individual ones of the automated actions of the individual ones of the automation records fall within the individual sets of permissions of the individual creators, generating the attribution labels to include the identifications of the individual creators, including responsive to a determination that the first automated action falls within a first permission of the first user, the first attribution label includes an identification of the first user; and responsive to determinations that the individual ones of the automated actions of the individual ones of the automation records do not fall within the individual sets of permissions of the individual creators, generating the attribution labels to be devoid of the identifications of the individual creators, including responsive to a determination that the first automated action does not fall within the first permission of the first user, the first attribution label is devoid of an identification of the first user.

4. The method of claim 1, wherein:
the environment state information further includes individual work status values of a work status parameter of the individual creators, an individual work status value of the work status parameter of an individual creator specifying whether the individual creator is active or inactive in the collaboration environment, such that the environment state information includes a first work status value for the first user who is the creator of the first automation record; and
the individual ones of the automation records include individual automation status values of an automation status parameter of the individual ones of the automation records, an individual automation status value of the automation status parameter of the individual automation record specifying whether the individual automation record is active or disabled, the individual automation status values of the automation status parameter of the individual ones of the automation records being determined based on the individual work status values of the work status parameter of the individual creators.

5. The method of claim 4, wherein:
responsive to the first work status value specifying the first user is active in the collaboration environment, a first automation status value of the first automation record specifies the first automation record is active; and
responsive to the first work status value specifying the first user is inactive in the collaboration environment, the first automation status value of the first automation record specifies the first automation record is disabled.

6. The method of claim 4, further comprising responsive to the individual work status values specifying the individual creators are inactive in the collaboration environment, reassigning the individual ones of the automation records to other ones of the users having the individual work status values specifying the other ones of the users are active in the collaboration environment, including:
responsive to the first work status value specifying the first user is inactive in the collaboration environment, reassigning the first automation record to a third user having a second work status value specifying the third user is active in the collaboration environment.

7. The method of claim 1, wherein individual ones of the attribution labels are presented at individual portions of the user interface reflecting the effectuated ones of the automated actions.

8. The method of claim 1, wherein an individual attribution label includes an individual avatar of an individual creator and/or an individual username of the individual creator.

9. The method of claim 1, wherein one or more of the attribution labels are devoid of an indication of an individual creator.

10. The method of claim 1, wherein the first automated action is effectuated within the collaboration environment and a second automated action is effectuated outside the collaboration environment.

11. A system configured to attribute automated actions within a collaboration environment, the system comprising:
one or more physical processors configured by machine-readable instructions to:
manage, at a server, environment state information maintaining a collaboration environment, the collaboration environment facilitating interaction by users with the collaboration environment, the users interacting with the collaboration environment via remotely located client computing platforms communicating with the server over an Internet connection, the environment state information including attribution information and automation records for automated actions to carry out in response to trigger events, an individual automation record defining one or more of the trigger events and one or more of the automated actions to carry out in response to occurrence of the one or more of the trigger events, the attribution information indicating individual creators of individual ones of the automation records, such that the attribution information indicates a first user as a creator of a first automation record, the first automation record defining a first trigger event and a first automated action to carry out in response to the first trigger event;
establish the Internet connection between the remotely located client computing platforms and the server;
effectuate communication of information from the server to the remotely located client computing platforms over the Internet connection so that the remotely located client computing platforms present a user interface of the collaboration environment;
identify, at the server, the users who are implementing the automation records, including identifying a second user is implementing the first automation record created by the first user;
monitor, by the server, the environment state information to detect occurrences of the trigger events based on the interactions by the users with the collaboration environment via the remotely located client computing platforms;
detect, at the server and based on monitoring the environment state information, the occurrences of the trigger events, such that an occurrence of the first trigger event is detected;
execute, by the server, the automated actions for the users implementing the automation records, the automated actions executed by the server corresponding to detected occurrences of the trigger events in the collaboration environment, including executing the first automated action in the collaboration environment for the second user in response to the occurrence of the first trigger event; and
update, based on execution of the automated actions, the information communicated from the server to the remotely located client computing platforms so that the user interface presented by the remotely located client computing platforms displays, for the users who are implementing the automation records, attribution labels for executed ones of the automated actions, wherein the attribution labels are generated based on the attribution information such that the attribution labels identify the individual creators of the individual ones of the automation records, such that presentation is effectuated of a first attribution label in the user interface of the collaboration environment for the second user, the first attribution label identifying the first user as the creator of the first automation record.

12. The system of claim 11, wherein the attribution information includes one or more transparency values of a transparency parameter, wherein an individual transparency value of the transparency parameter specifies whether the individual ones of the automated actions are attributed to the individual creators of the individual ones of the automation records, and wherein the attribution information further includes a first transparency value of the transparency parameter for the first automation record, such that:
   responsive to the first transparency value specifying the first automated action is attributed to the first user, the first attribution label includes an identification of the first user; and
   responsive to the first transparency value specifying the first automated action is not attributed to the first user, the first attribution label is devoid of an identification of the first user.

13. The system of claim 11, wherein the one or more physical processors are further configured by the machine-readable instructions to:
   access permission records of the individual creators of the individual ones of the automation records, individual ones of the permission records of the individual creators specifying individual sets of permissions of the individual creators within the collaboration environment;
   determine whether the individual ones of the automated actions of the individual ones of the automation records fall within the individual sets of permissions of the individual creators; and
   generate the attribution labels based on determination of whether the individual ones of the automated actions of the individual ones of the automation records fall within the individual sets of permissions of the individual creators, such that:
      responsive to determinations that the individual ones of the automated actions of the individual ones of the automation records fall within the individual sets of permissions of the individual creators, generate the attribution labels to include the identifications of the individual creators, such that responsive to a determination that the first automated action falls within a first permission of the first user, the first attribution label includes an identification of the first user; and
      responsive to determinations that the individual ones of the automated actions of the individual ones of the automation records do not fall within the individual sets of permissions of the individual creators, generate the attribution labels to be devoid of the identifications of the individual creators, such that responsive to a determination that the first automated action does not fall within the first permission of the first user, the first attribution label is devoid of an identification of the first user.

14. The system of claim 11, wherein:
   the environment state information further includes individual work status values of a work status parameter of the individual creators, an individual work status value of the work status parameter of an individual creator specifying whether the individual creator is active or inactive in the collaboration environment, such that the environment state information includes a first work status value for the first user who is the creator of the first automation record; and
   the individual ones of the automation records include individual automation status values of an automation status parameter of the individual ones of the automation records, an individual automation status value of the automation status parameter of the individual automation record specifying whether the individual automation record is active or disabled, the individual automation status values of the automation status parameter of the individual ones of the automation records being determined based on the individual work status values of the work status parameter of the individual creators.

15. The system of claim 14, wherein:
   responsive to the first work status value specifying the first user is active in the collaboration environment, a first automation status value of the first automation record specifies the first automation record is active; and
   responsive to the first work status value specifying the first user is inactive in the collaboration environment, the first automation status value of the first automation record specifies the first automation record is disabled.

16. The system of claim 14, wherein responsive to the individual work status values specifying the individual creators are inactive in the collaboration environment, reassign the individual ones of the automation records to other ones of the users having the individual work status values specifying the other ones of the users are active in the collaboration environment, such that:
   responsive to the first work status value specifying the first user is inactive in the collaboration environment, reassign the first automation record to a third user having a second work status value specifying the third user is active in the collaboration environment.

17. The system of claim 11, wherein individual ones of the attribution labels are presented at individual portions of the user interface reflecting the effectuated ones of the automated actions.

18. The system of claim 11, wherein an individual attribution label includes an individual avatar of an individual creator and/or an individual username of the individual creator.

19. The system of claim 11, wherein one or more of the attribution labels are devoid of an indication of an individual creator.

20. The system of claim 11, wherein the first automated action is effectuated within the collaboration environment and a second automated action is effectuated outside the collaboration environment.

* * * * *